United States Patent [19]

Croissant

[11] 4,301,442

[45] Nov. 17, 1981

[54] VEHICULAR ANTI-THEFT DEVICE

[76] Inventor: Robert E. Croissant, 34 Forestwood Dr., Woodstock, N.Y.

[21] Appl. No.: 190,482

[22] Filed: Sep. 24, 1980

[51] Int. Cl.³ ............................................. G08B 13/00
[52] U.S. Cl. ...................................... 340/64; 180/275
[58] Field of Search .................. 340/52 R, 56, 63, 64; 180/275

[56] References Cited

U.S. PATENT DOCUMENTS 3,720,284   3/1973   Myers ...................................... 340/64
3,834,484   9/1974   Sangster ................................. 340/64

*Primary Examiner*—Alvin H. Waring
*Attorney, Agent, or Firm*—Daniel Jay Tick

[57] ABSTRACT

A vehicular anti-theft device has a clamping member for clamping the tire of a vehicle under pressure to prevent rotation of the wheel of the vehicle on which the tire is mounted. An actuating device mounted on the vehicle and coupled to the clamping member selectively moves the clamping member onto the tire to clamp the tire and away from the tire to release the tire. A control mounted in the vehicle and coupled to the actuating device includes the ignition switch of the ignition system of the vehicle. The control controls the operation of the actuating device to clamp the tire when the ignition is turned OFF and releases the tire when the operator of the vehicle provides a predetermined code indication.

11 Claims, 7 Drawing Figures

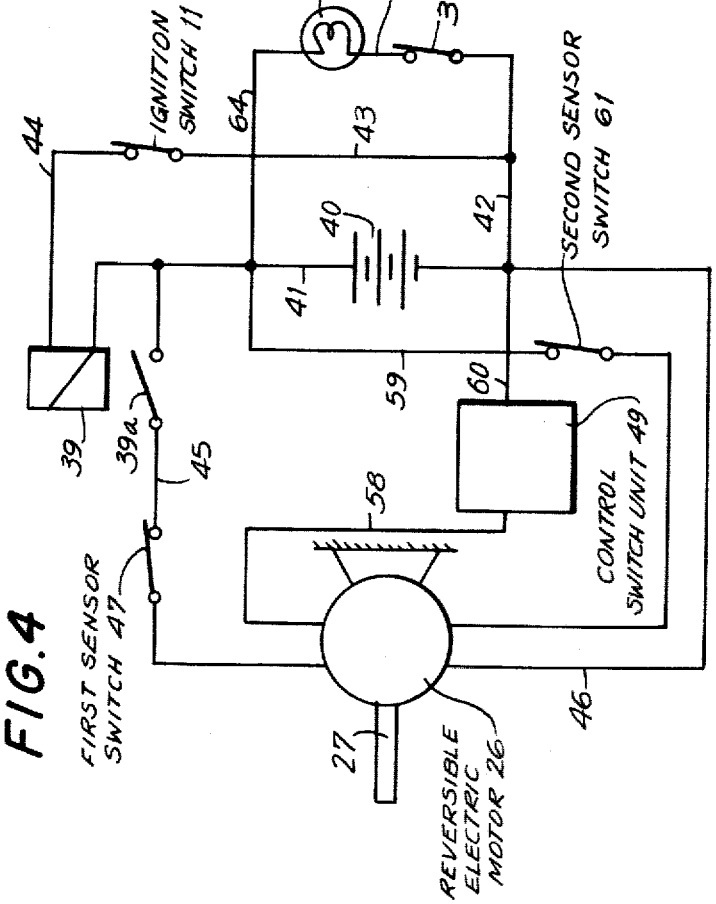

VEHICULAR ANTI-THEFT DEVICE

BACKGROUND OF THE INVENTION

The present invention relates to a vehicular anti-theft device. More particularly, the invention relates to a vehicular anti-theft device for a vehicle having an engine, a battery, an ignition system for the engine, the ignition system including an ignition switch for energizing the ignition system when turned ON and deenergizing the ignition system when turned OFF, a wheel and an inflated tire mounted on the wheel.

In our present day society, property is held in very low esteem by a segment of the population who steal automotive vehicles in great numbers. There are many types of vehicular theft alarm systems which produce supposedly loud and strident signals when a vehicle is entered illicitly. Unfortunately, most of these signals are rather weak sirens which are ignored by almost everyone who hears them. The alarm systems are thus essentially worthless.

There are alarm systems in effect which cause the horn and/or headlights of the vehicle to operate when an attempt is made to steal it. Some of these systems may even turn off the engine a short period after the vehicle has been stolen. The thief thus has time to severely damage the vehicle.

There is no known system for immobilizing an automotive vehicle by preventing its wheels from turning when an attempt is made to steal it. Such a system would save the owners of automobile, truck, motorcycle, and the like, as well as insurance companies, millions of dollars a year by preventing theft and damage of the vehicles.

The principal object of the invention is to provide a vehicular anti-theft device for an automotive vehicle, which device completely immobilizes the vehicle when an attempt is made to steal it.

An object of the invention is to provide a vehicular anti-theft device for an automotive vehicle, which device is of simple structure and installed with facility and convenience on any model of an existing automotive vehicle.

Another object of the invention is to provide a vehicular anti-theft device for an automotive vehicle, which device functions efficiently, effectively and reliably to completely immobilize the vehicle when the anti-theft device is activated.

Still another object of the invention is to provide a vehicular anti-theft device for an automotive vehicle which device is activated to completely immobilize the vehicle when the operator of the vehicle turns OFF the ignition switch and is deactivated only upon the provision of a predetermined code indication by the operator of the vehicle.

BRIEF SUMMARY OF THE INVENTION

In accordance with the invention, a vehicular anti-theft device for an automotive vehicle having an engine, a battery, an ignition system for the engine, the ignition system including an ignition switch for energizing the ignition system when turned ON and deenergizing the ignition system when turned OFF, a wheel and an inflated tire mounted on the wheel, comprises a clamping member for clamping the tire of a vehicle under pressure to prevent rotation of the wheel on which the tire is mounted. An actuating device mounted on the vehicle and coupled to the clamping member selectively moves the clamping member onto the tire to clamp the tire, and away from the tire to release the tire. A control mounted in the vehicle and coupled to the actuating device includes the ignition switch of the vehicle for controlling the operation of the actuating device to clamp the tire when the ignition switch is turned OFF and releases the tire upon provision of a predetermined code indication.

The tire has a cylindrical surface and the clamping member comprises a curved plate having a partly cylindrical configuration fitting part of the cylindrical surface of the tire.

The curved plate has spaced opposite lateral side edges and an axis with substantially flat plates extending from the centers of the side edges toward the axis and prevents removal of the tire from the wheel when the clamping member clamps the tire.

The actuating device comprises a reversible electric motor having a motor shaft driven thereby to rotate in first and second opposite rotary directions. A coupling device couples the motor shaft to the clamping member in a manner whereby the clamping member is moved toward the tire in a first linear direction when the motor rotates the motor shaft in the first rotary direction and away from the tire when the motor rotates the motor shaft in the second rotary direction.

The control comprises a relay having a relay energizing winding electrically connected in circuit with the ignition switch and the battery. The relay has a normally open first relay contact arm controlled by the relay energizing winding and electrically connected in circuit with the battery and the motor in a manner whereby when the ignition switch is ON the relay energizing winding is energized and the first relay contact arm is retained open whereby the motor is deenergized, and when the ignition switch is OFF the relay energizing winding is deenergized and the first relay contact arm is closed whereby the motor is energized and rotates the motor shaft in the first rotary direction thereby moving the clamping member in the first linear direction, toward the tire.

The coupling device of the actuating device comprises a worm gear spindle member threadedly coupled to the motor shaft for movement in the first linear direction when the motor shaft rotates in the first rotary direction and in the second linear direction when the motor shaft rotates in the second rotary direction. A support shaft is affixed to the clamping member. A compression spring couples the worm gear spindle member to the support shaft whereby movement of the worm gear spindle member in the first and second linear directions results in movement of the clamping member in the first and second linear directions, respectively.

The control further comprises a first sensor switch positioned at a first predetermined point in the path of movement of the support shaft and electrically connected in circuit with the battery, the motor and the first relay contact arm. The first sensor switch is normally closed, and is opened by the support shaft when the support shaft reaches the first predetermined point thereby deenergizing the motor when the clamping member clamps the tire to a predetermined extent and maintaining the clamping member in clamping position.

The control further comprises a normally open control switch unit having a plurality of manually operated code indications for closing the control switch unit when a predetermined combination of the code indications is provided. The control switch unit is electrically connected in circuit with the battery and the motor in a manner whereby when the predetermined combination of the code indications is provided, the motor is energized and rotates the motor shaft in the second rotary direction thereby moving the clamping member in the second linear direction away from the tire.

The control further comprises a second sensor switch positioned at a second predetermined point in the path of movement of the worm gear spindle member and electrically connected in circuit with the battery, the control switch unit and the motor. The second sensor switch is normally closed and is opened by the worm gear spindle member when the worm gear spindle member reaches the second predetermined point thereby deenergizing the motor when the worm gear spindle member returns to its initial position after movement in the second linear direction.

The relay has a normally closed second relay contact arm controlled by the relay energizing winding. A signal lamp is electrically connected in circuit with the second relay contact arm and the battery in a manner whereby the lamp is energized when the first relay contact arm is open and is deenergized when the first relay contact arm is closed and the second relay contact arm is opened by the relay energizing winding.

BRIEF DESCRIPTION OF THE DRAWINGS

In order that the invention may be readily carried into effect, it will now be described with reference to the accompanying drawings, wherein:

FIG. 4 is a circuit diagram of the electrical system of an embodiment of the vehicular anti-theft device of the invention;

FIG. 5 is a schematic diagram of an embodiment of the front face of the conrol switch unit of the vehicular anti-theft device of the invention;

FIG. 6 is a side view of an embodiment of the clamping member of the vehicular anti-theft device of the invention; and FIG. 7 is a view, taken along the lines VII—VII, of FIG. 6.

DETAILED DESCRIPTION OF THE INVENTION

The vehicular anti-theft device of the invention is for an automotive vehicle having an engine and an ignition system for the engine (not shown in the FIGS.) and a battery (FIG. 4). The ignition system includes an ignition switch 11 (FIG. 4) for energizing the ignition system, in the usual manner, through an ignition key (not shown in the FIGS.), when turned ON and deenergizing the ignition system when turned OFF.

Figure 1:
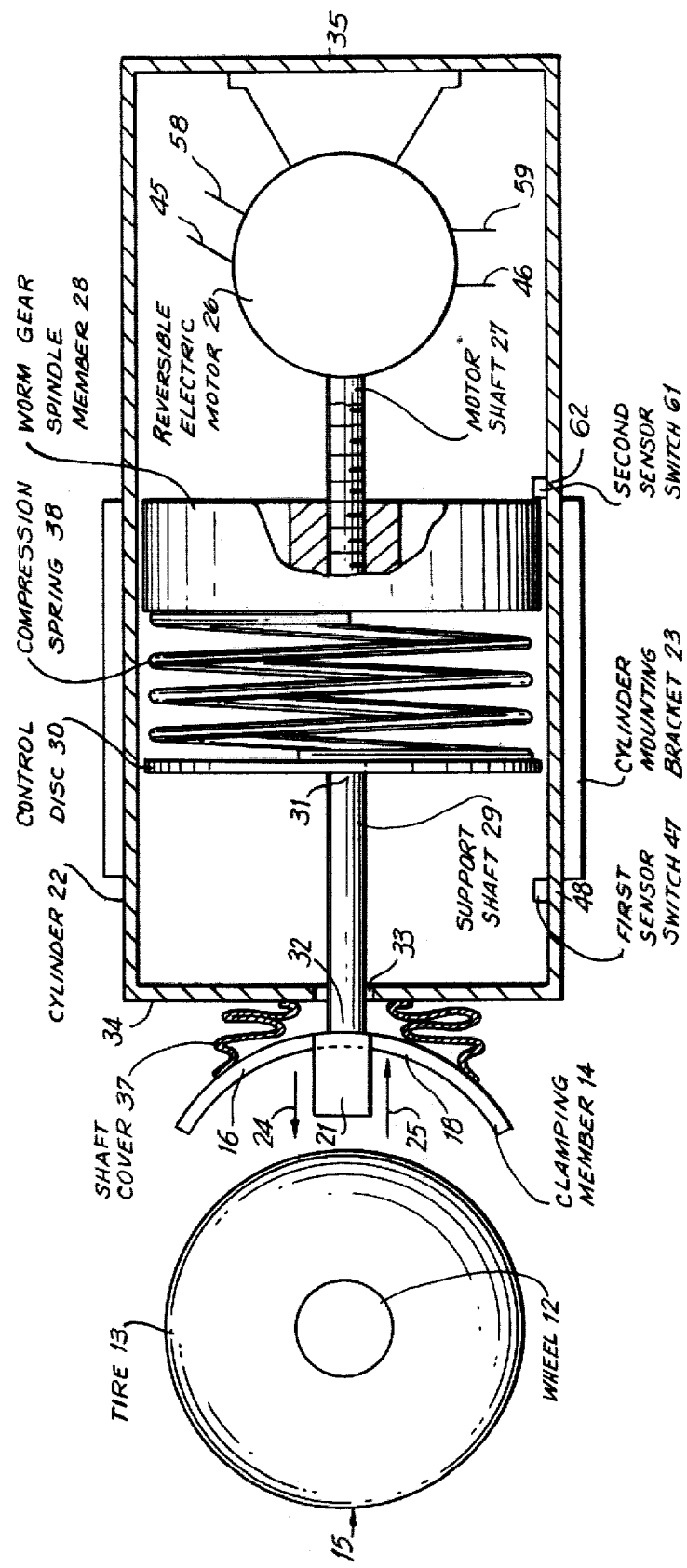
FIG. 1 is a schematic diagram, partly cut away, and partly in section, of an embodiment of the vehicular anti-theft device of the invention in deactivated condition, such as during operation of the vehicle.
Figure 2:
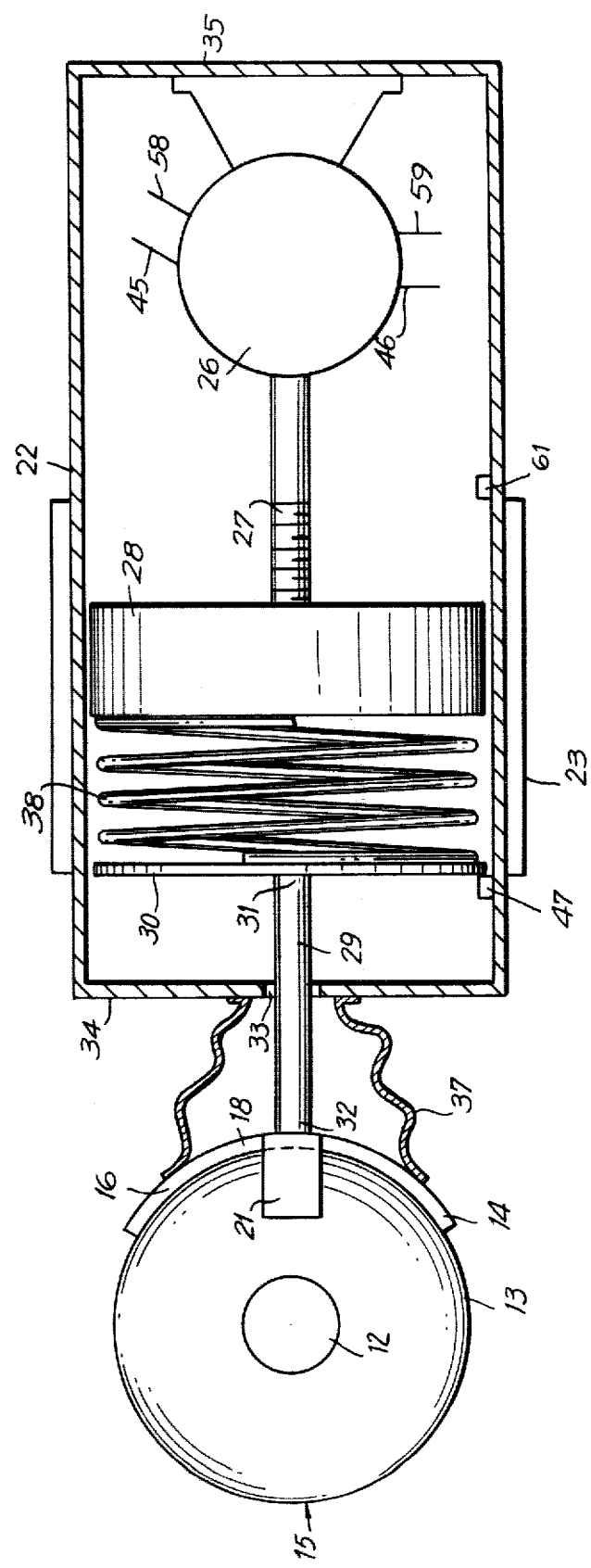
FIG. 2 is a schematic diagram, partly in section, of the embodiment of FIG. 1 in activated condition, such as when the vehicle is parked.
Figure 3:
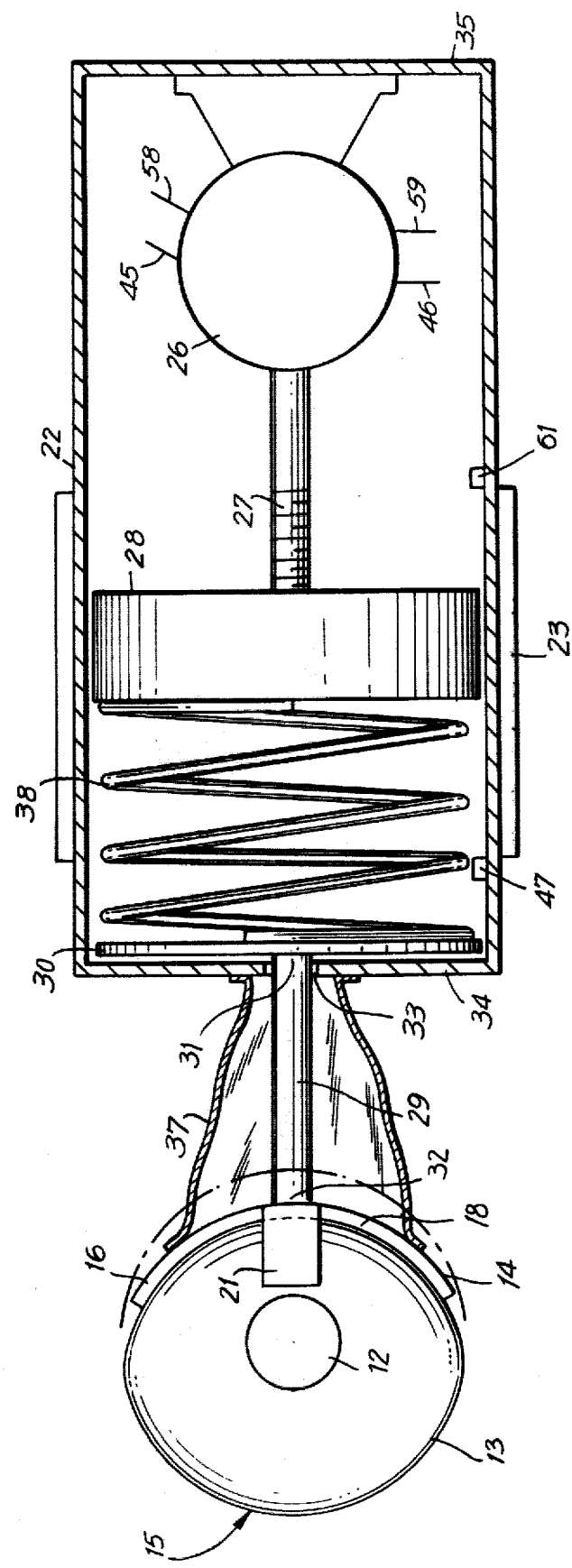
FIG. 3 is a schematic diagram, partly in section, of the embodiment of FIG. 1 in activated condition when the tire is deflated, such as when the vehicle is parked and has a flat, or partially flat, tire.

Although commonly used automotive vehicles have at least two wheels, and may have ten or more wheels, the standard passenger vehicle has four wheels. In order to maintain the clarity of illustration, the vehicular anti-theft device of the invention is hereinafter described with relation to a single wheel, although it is intended to be applied to all the wheels of the vehicle. Thus, a wheel 12 of the automotive vehicle is shown in FIGS. 1 to 3. The wheel 12 has an inflated tire 13 mounted thereon, as shown in FIGS. 1 to 3.

The vehicular anti-theft device of the invention comprises a clamping member 14 (FIGS. 1 to 3) for clamping the tire 13 of the vehicle under pressure to prevent rotation of the wheel 12 on which said tire is mounted. The tire 13 has a cylindrical tread surface 15 (FIGS. 1 to 3). The clamping member 14 comprises a curved plate 16 having a partly cylindrical configuration (FIGS. 1 to 3, 6 and 7) which fits part of the cylindrical surface 15 of the tire 13, as shown in FIGS. 2 and 3. The curved plate 16 of the clamping member 14 has spaced opposite lateral side edges 17 and 18 (FIG. 7). The lateral side edge 18 is shown in the views of FIGS. 1 to 3 and 6.

The curved plate 16 has an axis 19 (FIG. 6), which is the axis of a cylinder which would be formed if said plate were continued to form a complete cylindrical configuration. Substantially flat plates 20 and 21 (FIG. 7) extend from the centers of the side edges 17 and 18 of the curved plate 16, respectively, toward the axis 19. Only the flat plate 21, extending from the center of the side edge 18, is shown in the views of FIGS. 1 to 3 and 6. The flat plates 20 and 21 move alongside the sides of the tire 13 when the curved plate 16 clamps the cylindrical surface 15 of said tire, thereby preventing removal of said tire from the wheel 12 during activation of the anti-theft device of the invention, when the clamping member 14 clamps said tire.

The vehicular anti-theft device of the invention further comprises an actuating device mounted on the vehicle and coupled to the clamping member 14 (FIGS. 1 to 3) for selectively moving said clamping member onto the tire 13 to clamp said tire, as shown FIGS. 2 and 3, and away from said tire to release said tire, as shown in FIG. 1. The actuating device is preferably housed in a cylinder 22 (FIGS. 1 to 3) which is affixed to the vehicle via a cylinder mounting bracket 23 of any suitable type (FIGS. 1 to 3). The actuating device moves the clamping member 14 toward and onto the tire 13, in the direction of an arrow 24 in FIG. 1, when the vehicular anti-theft device of the invention is activated, and moves said clamping member away from said tire, in the direction of an arrow 25 in FIG. 1, when the vehicular anti-theft device is deactivated.

The actuating device comprises a reversible electric motor 26 (FIGS. 1 to 4) having a motor shaft 27 (FIGS. 1 to 4) driven thereby to rotate in first and second opposite rotary directions such as, for example, clockwise and counterclockwise. A coupling device, shown in FIGS. 1 to 3, couples the motor shaft 27 to the clamping member 14 in a manner whereby said clamping member is moved toward the tire 13 in a first linear direction, indicated by the arrow 24 in FIG. 1, when said motor rotates said motor shaft in the first rotary direction, and away from said tire in a second linear direction, indicated by the arrow 25 in FIG. 1, when said motor rotates said motor shaft in the second rotary direction.

The coupling device of the actuating device, shown in FIGS. 1 to 3, comprises a worm gear spindle member 28 threadedly coupled to the motor shaft, as shown in FIG. 1, for movement in the first linear direction 24 when said motor shaft rotates in the first rotary direction, and in the second linear direction 25 when said motor shaft rotates in the second rotary direction. A support shaft 29 is affixed to the clamping member 14, as shown in FIGS. 1 to 3. The support shaft 29 has a control disc or circular guide plate 30 extending radially from the end 31 thereof farthest from the clamping member 14 (FIGS. 1 to 3). The support shaft 29 is positioned substantially coaxially, primarily in the cylinder 22, as shown in FIGS. 1 to 3, and its end 32 at the clamping member 14 extends through an axial hole 33 formed through a base end 34 of said cylinder (FIGS. 1 to 3).

The motor 26 is mounted on the opposite base end 35 of the cylinder 22 (FIGS. 1 to 3). If the motor 26 is mounted outside the cylinder 22, the motor shaft 27 passes through a hole (not shown in the FIGS.) formed through the base end 35 of said cylinder, into said cylinder (FIGS. 1 to 3). The motor 27 is preferably mounted on the base end 35 of the cylinder 22, inside said cylinder, as shown in FIGS. 1 to 3. The support shaft 29 is protected from dirt and extraneous material by a flexible shaft cover 37 which is an expandable sleeve affixed between the base end 34 of the cylinder 22 and the curved plate 16 of the clamping member 14 (FIGS. 1 to 3).

The coupling device of the actuating device further comprises a compression spring 38 (FIGS. 1 to 3) coupling the worm gear spindle member 28 to the support shaft 29, in the cylinder 22.

The vehicular anti-theft device of the invention further comprises a control mounted in the vehicle and coupled to the actuating device (FIG. 4). The control includes the ignition switch 11 (FIG. 4) of the ignition system of the vehicle and controls the operation of the actuating device to clamp the tire 13 when said ignition system is turned OFF, and releases said tire when a predetermined code indication is provided. The control comprises a relay having a relay energizing winding 39 electrically connected in circuit with the ignition switch 11 and the battery 40 of the vehicle, via electrical conductors 41, 42, 43 and 44, as shown in FIG. 4.

The relay has a normally open first relay contact arm 39a controlled by the relay energizing winding 39, as shown in FIG. 4. The first relay contact arm 39a is electrically connected in circuit with the battery 40 of the vehicle and the motor 26 via electrical conductors 45 and 46 and the conductor 41, as shown in FIG. 4.

When the ignition switch 11 is ON, the relay energizing winding 39 is energized and the first relay contact arm 39a is retained open whereby the motor 26 is deenergized. The vehicular anti-theft device is then in its deactivated condition, shown in FIGS. 1 to 4. When the ignition switch 11 is OFF, the relay energizing winding 39 is deenergized and the first relay contact arm 39a is closed. The motor 26 is thereby energized and rotates the motor shaft 27 in the first rotary direction thereby moving the clamping member 14 in the first linear direction 24 toward the tire 13. The vehicular anti-theft device is in its activated condition, shown in FIGS. 2 and 3, when the clamping member 14 clamps the tire 13.

The control further comprises a first sensor switch 47 FIGS. 1 to 4) of any suitable type, such as, for example, a microswitch. The first sensor switch 47 is positioned in the cylinder 22 at a first predetermined point 48 (FIG. 1) in the path of movement of the support shaft 29. That is, the first sensor switch 47 is positioned in the path of movement of the control disc or guide plate 30 of the support shaft 29, as shown in FIGS. 1 to 3. The first sensor switch 47 is electrically connected in circuit with the battery 40, the motor 26 and the first relay contact arm 39a, as shown in FIG. 4.

The first sensor switch 47 is normally closed, as shown in FIG. 4, and is opened by the support shaft 29, or more particularly, by the control disc or circular guide plate 30 of said support shaft, when said support shaft reaches the predetermined point 48, as shown in FIG. 2, and when said control disc passes said first sensor switch in the direction 24, as shown in FIG. 3. The opening of the first sensor switch 47 deenergizes the motor 26 when the clamping member 14 clamps the tire 13 to a predetermined extent (FIGS. 2 and 3) when the tire is fully inflated, as shown in FIG. 2 and when the tire is partially inflated or flat, as shown in FIG. 3, and maintains said clamping member in clamping position, shown in FIGS. 2 and 3.

The control further comprises a normally open control switch unit 49 (FIGS. 4 and 5) having a plurality of manually operated code indications for closing said control switch when a predetermined combination of the code indications is provided. The code indications are controlled manually via keys 50, 51, 52, 53, 54, 55, 56, 57, and so on, shown in FIG. 5. The control switch unit 49 functions to close when someone punches the predetermined combination of code indications via its keys 50 to 57, and so on, in the correct sequence. The control switch unit 49 remains open at all times, unless the predetermined combination of alphanumeric code indications is provided in the correct sequence. The control switch unit 49 is electrically connected in circuit with the battery 40 and the motor 26 via electrical conductors 58, 59 and 60 and the conductor 41, as shown in FIG. 4. When the predetermined combination of the code indications is provided, the motor 26 is energized and rotates the motor shaft 27 in the second rotary direction, which is the reverse direction of said motor, thereby moving the clamping member 14 in the second linear direction 25 away from the tire 13, as shown in FIG. 1.

All the electrical conductors extending from components in the cylinder 22 such as, for example, the reversible electric motor 26, to components outside said cylinder such as, for example, the control switch unit 49, are encased in anti-theft jackets of any suitable type to prevent cutting of said conductors and theft of said components.

The control further comprises a second sensor switch 61 (FIGS. 1 to 4) positioned at a second predetermined point 62 (FIG. 1) in the cylinder 22, in the path of movement of the worm gear spindle member 28. The second sensor switch 61 is electrically connected in circuit with the battery 40, the control switch unit 49 and the motor 26, as shown in FIG. 4. The second sensor switch 61 may comprise any suitable switch such as, for example, a microswitch, and may be the same type of switch as the first sensor switch 47. The second sensor switch 61 is normally closed, as shown in FIG. 4, and is opened by the worm gear spindle member 28 when said worm gear spindle member reaches the second predetermined point 62, as shown in FIG. 1. Thus, the second sensor switch 61 is opened, and deenergizes the motor 26, when the worm gear spindle member 28 returns to its initial position, as shown in FIG. 1, after movement in the second linear direction 25.

The relay has a normally closed second relay contact arm 39b (FIG. 4) controlled by the relay energizing winding 39. A signal lamp 63 (FIGS. 4 and 5) is electrically connected in circuit with the second relay contact arm 39b and the battery 40 via the electrical conductors 40 and 42 and electrical conductors 64 and 65 (FIG. 4).

The lamp 63 is energized when the first relay contact arm 39a is open (FIG. 4), to indicate that the vehicular anti-theft device is not activated, and is deenergized when said first relay contact arm is closed and the second relay contact arm 39b is opened by the relay energizing winding 39, to indicate that said vehicular anti-theft device is activated.

If desired, the signal lamp 63 may be energized when the first relay contact arm 39a is closed, to indicate that the vehicular anti-theft device is activated, and deenergized when said first relay contact arm is open and said second relay contact arm 39b is closed, to indicate that said vehicular anti-theft device is deactivated. This may be accomplished by providing a normally open second relay contact arm 39b and having the relay energizing winding 39 close said second relay contact arm when it is energized, to indicate that the vehicular anti-theft device is activated.

Four signal lamps 63, 66, 67 and 68 are provided (FIG. 5) for the four wheels of an average vehicle, respectively, since the aforedescribed clamping member, actuating device and control is preferably provided for each wheel of the vehicle.

The control switch unit 49 of the control is provided at a location handy to the operator of the vehicle, preferably on, or under, the dashboard in the cab of the vehicle.

When the ignition switch 11 of the ignition system is turned OFF, current flows from the battery 40 via said ignition switch to the relay energizing winding 39, which closes the first relay contact arm 39a to cause current to flow from said battery to the motor 26. The motor 26 moves the worm gear spindle member 28 in the direction 24 via the worm gear of said member. The spindle member 28 applies pressure to the compression spring 38, which also moves in the direction 24, applying pressure to the support shaft 29 until the clamping member 14 contacts the tire 13. At this point of operation, current still flows through the control circuit and maintains the vehicular anti-theft device operational, until a predetermined pressure is applied to the tire 13. The compression spring 38, which is designed to have a predetermined length before operation of the vehicular anti-theft device, starts being compressed in the cylinder 22, until the first sensor switch 47 opens, due to abutment of the control disc or guide member 30 of the support shaft 29 therewith, and said first sensor switch deenergizes the motor 26 by opening the control circuit. At such time, a predetermined pressure is applied to the tire 13 and prevents any movement of the wheel 12, forward or backward, thus preventing the vehicle from being moved.

If, for any reason, air escapes from the tire 13 to cause a partial or complete flat condition thereof, during activation of the vehicular anti-theft device, the compression spring 38, which has been compressed due to operation of the device, forces the support shaft 29 farther in the direction 24 and moves the clamping member 14 farther into the tire 13. This permits air to escape from the tire 13.

When the owner of the vehicle wishes to deactivate the vehicular anti-theft device, to release the clamping members 14 from the four wheels of said vehicle, he or she punches the keys 50 to 57, and so on, of the control switch unit 49 (FIG. 4) to provide the predetermined code indication in the proper sequence. When the predetermined code indication has been indicated in the predetermined sequence of alphanumeric components, current flows from the battery 40 to all four motors 26, reversing the operation of said motors to reverse the direction of movement of the spindle members 28 to the direction 25, thereby moving the support shaft 29 and the compression spring 38 in the direction 25. This causes the clamping member 14 to be moved away from the tire 13, thereby releasing said tire and freeing the wheel 12 for movement in either direction. The spindle members 28 contact the second sensor switches 61, to open said second sensor switches and thereby open the control circuits and deenergize the motors 26.

The compression spring 38 consists of material which normally, in its uncompressed condition, exerts no pressure. The spring 38 exerts compression force when it is compressed, in attempting to expand to its initial, uncompressed, condition.

The predetermined position 48 of the first sensor switch 47 is such that the control circuit is opened, and the current cut off, when a predetermined pressure is applied by the clamping member 14 to the tire 13.

A plurality of dummy wires may be installed in the wiring harness and the control switch unit 49 to prevent anyone from breaking into said switch unit and determining the predetermined code indication. The dummy wires would cause the intruder to spend considerable time in trying to "break the code" and thereby discourage the attempt.

The control switch unit 49 is deactivated, to remain open, upon the provision of a special predetermined code indication, in order to permit the vehicle to be left at dealerships or repair shops for repairs or tire service work. This deactivates the vehicular anti-theft device, to enable repair operations by mechanics. A signal device such as, for example, a signal lamp 69 (FIG. 5), is preferably included in the control switch unit 49 to warn the owner of the vehicle that the anti-theft device is deactivated, as long as said control switch unit is open due to the provision of the special predetermined code indication. This would remind the operator of the vehicle to release the special predetermined code indication of the control switch unit 49 after regaining possession of his vehicle and return said switch unit to its normal operable condition, to enable activation of the anti-theft device.

In order to permit rapid and easy disassembly of the vehicular anti-theft device of the invention in the event of a need for maintenance thereof, and to prevent expensive maintenance and repairs, only four moving parts are provided in the vehicular anti-theft device of the invention.

In order to release one or more of the vehicular anti-theft devices installed in the vehicle, in the event of malfunction, each 12 volt electric motor 26 is mounted on the base part 35 of cylinder 22, inside or outside said cylinder, by eight outside bolts for access. These bolts, when removed, free the motor to revolve in either direction when a key lock assembly, hereinafter described, is released, and when a spanner wrench is used to revolve the motor and its shaft 27. The motor 26 and the shaft 27 are a unit and are assembled together, so it is best to turn them both, in case the motor and shaft happen to jam or lock together.

Two separate removable plates are provided for each cylinder 22. Each of the plates has four to eight holes for the installation of bolts therethrough to permit the plates to be mounted and bolted to the cylinder 22. One of the plates is a center plate, which, when removed, exposes the motor shaft 27. The motor shaft 27 is slotted, so that a spanner wrench may be accommodated in the slot to enable a person to reverse the direction of movement of the worm gear spindle member 28 and relieve the pressure from the tire of the vehicle. The other plate bears a key-operated lock, so that before the cylinder 22 may be opened, said other plate must be unlocked. Each cylinder 22 is provided with a different lock, so that a different key is needed for each lock. The lock button must be depressed in order to engage the lock button shaft with a corresponding accommodating groove formed in the housing of the motor 26. The key must be inserted and turned in order to release the lock button shaft from the motor housing groove.

While the invention has been described by means of a specific example and in a specific embodiment, I do no wish to be limited thereto, for obvious modifications will occur to those skilled in the art without departing from the spirit and scope of the invention.

I claim:

1. A vehicular anti-theft device for an automotive vehicle having an engine, a battery, an ignition system for the engine, the ignition system including an ignition switch for energizing said ignition system when turned ON and deenergizing said ignition system when turned OFF, a wheel and an inflated tire mounted on the wheel, said vehicular anti-theft device comprising clamping means for clamping the tire of a vehicle under pressure to prevent rotation of the wheel on which said tire is mounted;

actuating means mounted on the vehicle and coupled to said clamping means for selectively moving said clamping means onto said tire to clamp said tire and away from said tire to release said tire; and control means mounted in the vehicle and coupled to said actuating means and including the ignition switch of said vehicle for controlling the operation of said actuating means to clamp said tire when said ignition switch is turned OFF and releasing said tire upon the provision of a predetermined code indication.

2. A vehicular anti-theft device, as claimed in claim 1, wherein said tire has a cylindrical surface and said clamping means comprises a curved plate haing a partly cylindrical configuration fitting part of the cylindrical surface of said tire.

3. A vehicular anti-theft device as claimed in claim 1, wherein said tire has a cylindrical surface and said clamping means comprises a curved plate having a partly cylindrical configuration fitting part of the cylindrical surface of said tire, said plate having spaced opposite lateral side edges and an axis with substantially flat plates extending from the centers of the said side edges toward said axis and preventing removal of said tire from said wheel when said clamping means clamps said tire.

4. A vehicular anti-theft device as claimed in claim 1, wherein said actuating means comprises a reversible electric motor having a motor shaft driven thereby to rotate in first and second opposite rotary directions and coupling means coupling the motor shaft to said clamping means in a manner whereby said clamping means is moved toward said tire in a first linear direction when said motor rotates said motor shaft in the first rotary direction and away from said tire when said motor rotates said motor shaft in the second rotary direction.

5. A vehicular anti-theft device as claimed in claim 4, wherein said control means comprises a relay having a relay energizing winding electrically connected in circuit with said ignition switch and said battery, said relay having a normally open first relay contact arm controlled by said relay energizing winding and electrically connected in circuit with said battery and said motor in a manner whereby when said ignition switch is ON said relay energizing winding is energized and said first relay contact arm is retained open whereby said motor is deenergized and when said ignition switch is OFF said relay energizing winding is deenergized and said first relay contact arm is closed whereby said motor is energized and rotates said motor shaft in said first rotary direction thereby moving said clamping means in said first linear direction toward said tire.

6. A vehicular anti-theft device as claimed in claim 5, wherein said coupling means of said actuating means comprises a worm gear spindle member threadedly coupled to said motor shaft for movement in said first linear direction when said motor shaft rotates in said first rotary direction and in said second linear direction when said motor shaft rotates in said second rotary direction, a support shaft affixed to said clamping means and a compression spring coupling said worm gear spindle member to said support shaft whereby movement of said worm gear spindle member in said first and second linear directions results in movement of said clamping means in said first and second linear directions, respectively.

7. A vehicular anti-theft device as claimed in claim 6, wherein said control means further comprises a first sensor switch positioned at a first predetermined point in the path of movement of said support shaft and electrically connected in circuit with said battery, said motor and said first relay contact arm, said first sensor switch being normally closed and opened by said support shaft when said support shaft reaches said first predetermined point thereby deenergizing said motor when said clamping means clamps said tire to a predetermined extent and maintaining said clamping means in clamping position.

8. A vehicular anti-theft device as claimed in claim 7, wherein said control means further comprises a normally open control switch unit having a plurality of manually operated code indications for closing the control switch when a predetermined combination of the code indications is provided, said control switch unit being electrically connected in circuit with said battery and said motor in a manner whereby when said predetermined combination of the code indications is provided said motor is energized and rotates said motor shaft in said second rotary direction thereby moving said clamping means in said second linear direction away from said tire.

9. A vehicular anti-theft device as claimed in claim 8, wherein said control means further comprises a second sensor switch positioned at a second predetermined point in the path of movement of said worm gear spindle member and electrically connected in circuit with said battery, said control switch unit and said motor, said second sensor switch being normally closed and opened by said worm gear spindle member when said worm gear spindle member reaches said second predetermined point thereby deenergizing said motor when said worm gear spindle member returns to its initial position after movement in said second linear direction.

10. A vehicular anti-theft device as claimed in claim 9, wherein said relay has a normally closed second relay contact arm controlled by said relay energizing winding and further comprising a signal lamp electrically connected in circuit with said second relay contact arm and said battery in a manner whereby said lamp is energized when said first relay contact arm is open and is deenergized when said first relay contact arm is closed and said second relay contact arm is opened by said relay energizing winding.

11. A vehicular anti-theft device as claimed in claim 10, further comprising a cylinder and fastening means for affixing said cylinder to said vehicle, wherein said actuating means is housed in said cylinder.

* * * * *